E. N. BERGSTROM.
AUTOMOBILE WHEEL.
APPLICATION FILED APR. 3, 1917.
1,274,974.
Patented Aug. 6, 1918.
2 SHEETS—SHEET 1.
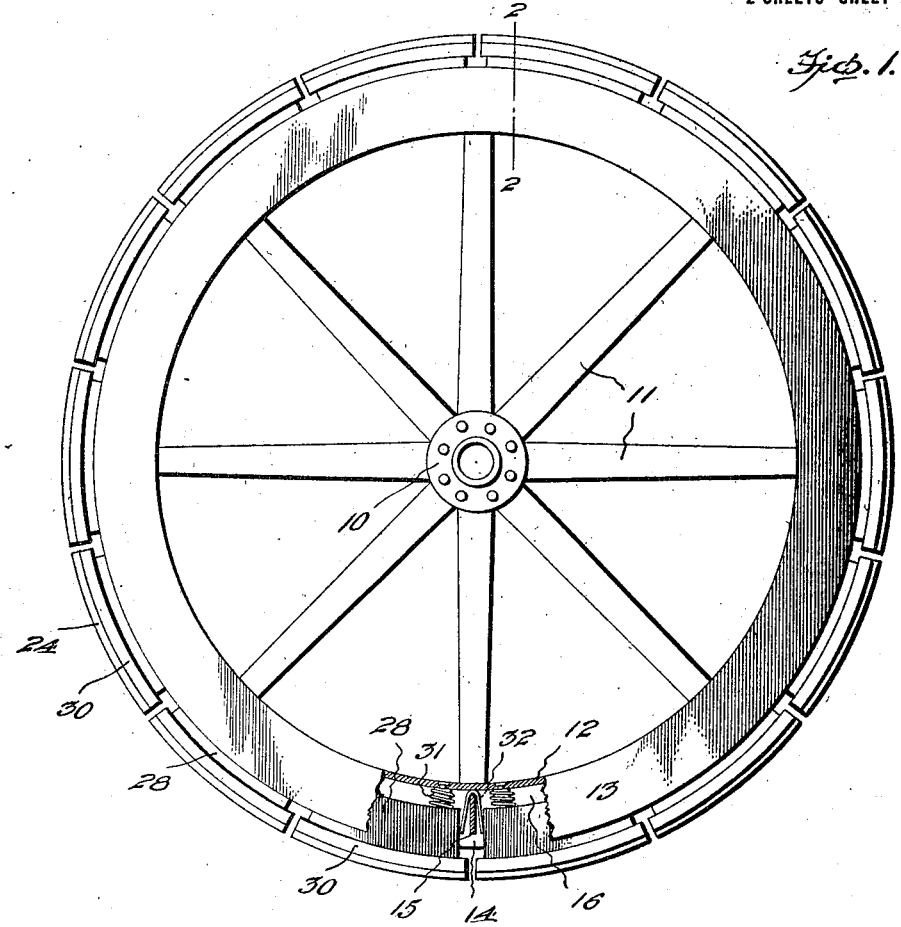
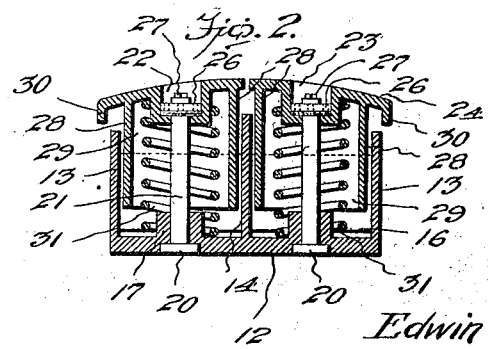
INVENTOR
Edwin N. Bergstrom.
WITNESSES
BY
ATTORNEY E. N. BERGSTROM.
AUTOMOBILE WHEEL.
APPLICATION FILED APR. 3, 1917.
1,274,974.
Patented Aug. 6, 1918.
2 SHEETS—SHEET 2.
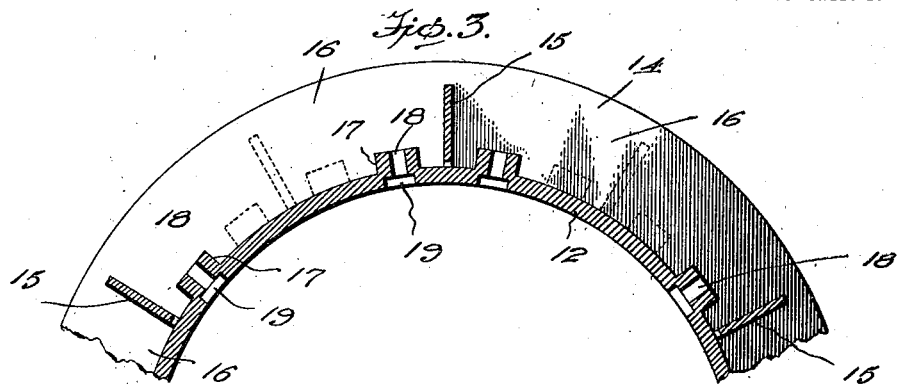
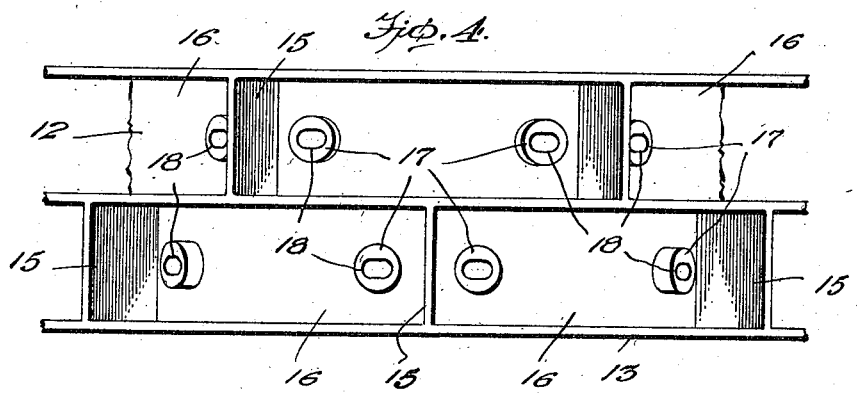
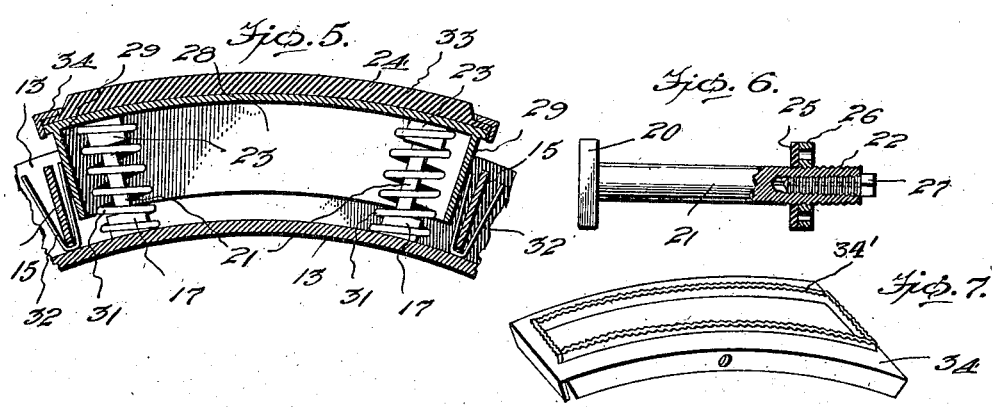
INVENTOR
Edwin N. Bergstrom.
WITNESSES
Paul M. Hunt.
Ross J. Woodward
BY Richard B. Owen.
ATTORNEY

UNITED STATES PATENT OFFICE.

EDWIN N. BERGSTROM, OF EAST LYNN, MASSACHUSETTS.

AUTOMOBILE-WHEEL.

1,274,974.     Specification of Letters Patent.     Patented Aug. 6, 1918.

Application filed April 3, 1917. Serial No. 159,489.

*To all whom it may concern:*

Be it known that I, EDWIN N. BERGSTROM, a citizen of the United States, residing at East Lynn, in the county of Essex and State of Massachusetts, have invented certain new and useful Improvements in Automobile-Wheels, of which the following is a specification.

This invention relates to an improved automobile wheel and the principal object of the invention is to provide an automobile wheel having an improved resilient tire structure which makes it unnecessary to provide an inflated tire and further making it unnecessary to provide resilient spokes.

Another object of the invention is to provide a wheel of the resilient tire or rim type in which there has been provided improved tread blocks and improved means for yieldably mounting these tread blocks.

Another object of the invention is to provide a wheel in which the tread blocks will be yieldably held against movement circumferentially of the wheel thus preventing noise when the tread blocks move radially under compression.

Another object of the invention is to so construct and mount these tread blocks that they may be securely but releasably held in place thus permitting them to be easily removed when necessary for the purpose of repairing.

This invention is illustrated in the accompanying drawings, wherein:—

Figure 1 is a view showing the improved automobile wheel in side elevation.

Fig. 2 is a transverse sectional view through the wheel taken along the line 2—2 of Fig. 1.

Fig. 3 is a fragmentary longitudinal sectional view through the rim portion of the wheel with the tread blocks removed.

Fig. 4 is a view showing a fragment of the rim portion of the wheel in plan with the tread blocks removed.

Fig. 5 is a longitudinal sectional view through a fragment of the wheel rim with the tread blocks in position.

Fig. 6 is a view showing one of the securing pins or bolts partly in elevation and partly in section.

Fig. 7 is a view showing a modified construction of clamp for connecting the tread pads with the tread blocks.

The wheel is provided with a hub 10 having spokes 11 extending therefrom to the rim 12 which rim is a channel rim having side walls 13 and a center dividing wall 14 dividing the rim longitudinally into side compartments, each of which is in its turn divided by cross strips or short partitions 15 into pockets 16. These pockets are provided with short studs 17 having openings 18 formed therein enlarged at their outer ends to provide feet 19 for the heads 20 of bolts 21. These bolts 21 extend through the studs 17 and have their threaded end portions 22 passing into the cups 23 of the tread blocks 24. Gaskets 25 are placed upon the threaded ends of the bolts within the cups 23 and when the securing nuts or washers 26 are put in place and tightened and the set screws or wedging screws 27 screwed tightly into place to spread the split ends of the bolts as shown in Fig. 6, the bolts will be securely but releasably held in place but at the same time permitted to have sufficient movement for the tread blocks to act properly. These tread blocks are provided with side and end walls 28 and 29 fitting within the pockets 16 and are further provided with depending side flanges 30 which together with the walls serve to guide the sliding movement of the tread blocks when the tread blocks move against the tension of the springs 31 positioned about the bolts 21 and engaging the studs 17 and cups 22. These springs normally hold the tread blocks extended as shown in Figs. 1, 2 and 5 but permit the tread blocks to move under compression with the springs taking up jolts received in passing over rough sections of a road. U-shaped springs 32 pass beneath the partitions 15 and have their arms engaging the end walls of the tread blocks to resist longitudinal movement of the tread blocks thus preventing noise as the automobile moves along a road.

If desired, tread pads 33 formed of rubber or other material may be placed upon the tread blocks and secured thereon by clamps 34 which clamps will be removable thus permitting the tread pads to be renewed when desired. These clamps may if desired be provided as shown in Fig. 7 with serrated flanges 34' for engaging the sides of the pads and providing anti-skid devices.

When this automobile wheel is in use, the tread blocks are mounted as shown in Figs. 2 and 5 and held in place by the bolts, one of which is shown in Fig. 6. The tread blocks are yieldably held extended by means of the springs 31 and therefore when going along a road, the tread blocks may move under compression. It should be noted from an inspection of Fig. 4 that the tread blocks will be positioned in staggered relation thus if one of the springs should become broken, the wedging pin or set screw 27 will be removed from each of the bolts 21 holding this block in place and the block can then be removed and a new spring put in place. There has been provided a very convenient and strong and durable wheel of the resilient tire type.

What is claimed is:—

1. A wheel including a channel rim having side walls and a center wall dividing the rim into side channels, each divided transversely to provide a plurality of pockets, perforated studs extending from the bottoms of said pockets, securing bolts extending through the studs into the pockets, tread blocks having side and end walls fitting into the pockets, the tread blocks being provided with cups alined with said studs and receiving the ends of said bolts, springs positioned within the pockets about the bolts and engaging the studs and cups, and securing means carried by the bolts within the cups to hold the tread blocks in place.

2. In a wheel, a rim having side walls and a center wall providing side channels, partitions in the side channels forming pockets, securing bolts extending from the bottoms of the pockets outwardly, tread blocks slidable in the pockets and provided with cups to receive the outer end portions of the securing bolts, springs positioned in the pockets about the bolts and engaging the tread blocks and the bottoms of the pockets, and securing means within said cups engaging the outer end portions of the bolts to releasably hold the tread blocks in place.

3. In a wheel, a rim structure having pockets, tread blocks provided with side and end walls fitting into the pockets and with side flanges in spaced relation to the side walls positioned to extend outside the side walls of the rim when the tread blocks move inwardly in the pockets, cups carried by the tread blocks, securing pins extending from the bottoms of the pockets into the cups, resilient means positioned about the pins and engaging the tread blocks and the bottoms of the pockets, and means within the cups engaging the outer end portions of the pins to limit the outward movement of the tread blocks.

4. A wheel including a rim having pockets, tread blocks fitting into the pockets, spring strips extending in spaced relation to the ends of the pockets and engaging the ends of the tread blocks to yieldably hold the tread blocks against movement longitudinally in the pockets, means slidably mounting the tread blocks and limiting the outward movement thereof, and resilient means yieldably holding the tread blocks extended.

5. A wheel having a rim provided with pockets, tread blocks slidably fitting into said pockets and provided with cups, pins extending from the bottoms of the pockets and having threaded outer end portions extending into the cups and split longitudinally and internally threaded, resilient means positioned about the pins to yieldably hold the blocks extended, securing nuts for the pins positioned in the cups and screwed upon the split outer end portions of the pins, and wedging screws screwed into the upper end portions of the pins to spread the pins and lock the securing nuts in place.

6. A wheel having a rim including longitudinally extending walls and cross strips connecting the walls to provide pockets, the strips terminating in spaced relation to the bottoms of the pockets, U-shaped spring elements passing beneath the cross strips and having their arms extending in spaced relation thereto, tread blocks positioned in the pockets and having their end portions engaged by the arms, means for slidably retaining the tread blocks in the pockets, and resilient means yieldably holding the tread blocks extended.

In testimony whereof I affix my signature in presence of two witnesses.

EDWIN N. BERGSTROM.

Witnesses:
ERNEST A. HODGDON,
WILLARD D. MARTIN.

Copies of this patent may be obtained for five cents each, by addressing the "Commissioner of Patents, Washington, D. C."